(12) United States Patent
Meyer et al.

(10) Patent No.: US 7,726,205 B2
(45) Date of Patent: Jun. 1, 2010

(54) TRANSDUCER FOR A ROTATING BODY

(75) Inventors: Richard A. Meyer, Chaska, MN (US); Douglas J. Olson, Plymouth, MN (US); Ian T. Kunsch, Bloomington, MN (US); Robert Leo Josephson, Savage, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 11/835,829

(22) Filed: Aug. 8, 2007

(65) Prior Publication Data

US 2008/0034894 A1    Feb. 14, 2008

Related U.S. Application Data

(60) Provisional application No. 60/836,554, filed on Aug. 8, 2006.

(51) Int. Cl.
*G01D 7/00*   (2006.01)
(52) U.S. Cl. .................................................. 73/862.041
(58) Field of Classification Search .................. 73/146, 73/146.5, 146.2, 862.195, 862.041, 862.046, 73/862.043, 862.044, 862.042
See application file for complete search history.

(56) References Cited

U.S. PATENT DOCUMENTS

| | | | |
|---|---|---|---|
| 4,655,080 A * | 4/1987 | Ongaro | ........................ 73/462 |
| 4,811,612 A | 3/1989 | Mercat | |
| 4,966,380 A * | 10/1990 | Mercat | ........................ 280/259 |
| 4,969,694 A | 11/1990 | Caron | |
| 5,018,597 A | 5/1991 | Wakabayashi et al. | |
| 5,025,884 A | 6/1991 | Wakabayashi et al. | |
| 5,097,701 A | 3/1992 | Nantua et al. | |
| 5,097,702 A | 3/1992 | Nantua et al. | |
| 5,969,268 A | 10/1999 | Sommerfeld et al. | |
| 6,002,327 A * | 12/1999 | Boesch et al. | ............... 340/442 |
| 6,038,933 A | 3/2000 | Meyer | |
| 6,418,797 B1 | 7/2002 | Ambrosina | |
| 6,688,168 B1 * | 2/2004 | Elliott et al. | ................... 73/146 |
| 6,729,178 B2 | 5/2004 | Leska, Sr. et al. | |
| 6,845,675 B2 * | 1/2005 | Meyer et al. | ........... 73/862.041 |

(Continued)

FOREIGN PATENT DOCUMENTS

DE          4431029 A1       3/1996

(Continued)

OTHER PUBLICATIONS

Official Search Report of the European Patent Office in counterpart foreign application No. PCT/US2007/017580 filed Aug. 8, 2007.

(Continued)

*Primary Examiner*—Jewel Thompson
(74) *Attorney, Agent, or Firm*—Steven M. Koehler; Westman, Champlin & Kelly, P.A.

(57)   ABSTRACT

A load cell assembly for sensing force and/or moment components on a rotating body supported by a frame includes an axle having opposite ends joined to the frame. A hub is supported by the axle and rotatable about a longitudinal axis thereof. A load cell body joined to the hub and the rotating body is used to sense force and/or moment components between the hub and the rotating body.

26 Claims, 13 Drawing Sheets

U.S. PATENT DOCUMENTS 7,028,540 B2 * 4/2006 Morikawa .................. 73/146
2006/0079382 A1 4/2006 Lassanske et al.

FOREIGN PATENT DOCUMENTS

| DE | 19857025 A1 | 7/1999 |
|---|---|---|
| EP | 0841549 A | 5/1998 |
| WO | WO 99/45350 A | 9/1999 |
| WO | WO 2004/027366 A | 4/2004 |
| WO | WO 2006/015284 A | 2/2006 |

OTHER PUBLICATIONS

Written Opinion of the European Patent Office in counterpart foreign application No. PCT/US2007/017580 filed Aug. 8, 2007.

* cited by examiner

TRANSDUCER FOR A ROTATING BODY

CROSS-REFERENCE TO RELATED APPLICATION

The present application is based on and claims the benefit of U.S. provisional patent application Ser. No. 60/836,554, filed Aug. 8, 2006, the content of which is hereby incorporated by reference in its entirety.

BACKGROUND

Wheel force transducer or load cells for measuring forces along or moments about three orthogonal axes are known. The wheel force transducer typically is mounted between and to a vehicle spindle and a portion of a vehicle rim. The transducer measures forces and moments reacted through a wheel assembly at the spindle as the vehicle is operated.

One form of a wheel force transducer that has enjoyed substantial success and critical acclaim has been the SWIFT transducer sold by MTS Systems Corporation of Eden Prairie, Minn. and is described in detail in U.S. Pat. Nos. 5,969,268 and 6,038,933. Generally, this transducer includes a load cell body having a rigid central member, a rigid annular ring and a plurality of tubular members extending radially and joining the central member to the annular ring. A plurality of sensing circuits are mounted to the plurality of tubular members. The rigid central member is mounted to the vehicle spindle, while the annular ring is attached to the vehicle rim. An encoder measures the angular position of the load cell body allowing the forces transmitted through the radial tubular members to be resolved with respect to an orthogonal stationary coordinate system. An external slip ring assembly provides power to and receives signals from the sensors on the load cell body.

SUMMARY

Aspects of the present invention relate to measuring and/or sensing forces and/or moments applied to a rotating body for example a wheel of a vehicle such as but not limited to a motorcycle.

A first aspect comprises a load cell assembly for sensing force and/or moment components on a rotating body supported by a frame. The assembly includes an axle having opposite ends joined to the frame. A hub is supported by the axle and rotatable about a longitudinal axis thereof. A load cell body joined to the hub and the rotating body is used to sense force and/or moment components between the hub and the rotating body.

A second aspect comprises a combination of a frame portion of a motorcycle or similar wheel assembly and a load cell assembly for sensing force and/or moment components on the motorcycle or similar wheel assembly. The load cell assembly includes an axle mounted at each end to the frame portion and a hub supported by the axle. A rim is provided and a tire is supported on the rim. A load cell body is operatively joined to the hub and the rim.

A third aspect comprises a load cell assembly for sensing force and/or moment components on a rotating body supported by a frame. The assembly includes an axle joined to the frame on at least one end of the axle. A hub is supported by the axle and rotatable about a longitudinal axis thereof. A load cell body is joined to the hub and the rotating body to sense force and/or moment components between the hub and the rotating body. A slip ring assembly is disposed in the hub having a first member movable relative to a second member, the first member being rotatable with the hub.

DETAILED DESCRIPTION OF THE ILLUSTRATIVE EMBODIMENTS

The Figures herein provided illustrate load cell systems well-suited for measuring force and moment components of a rotating body, and in one embodiment, a rotating body rotating on and about an axle supported at each end. An example of such a rotating body is a rolling wheel on, for instance, a trailer, cart or a vehicle such as but not limited to motorcycles. In the illustrative embodiments herein described, a motorcycle application will be used in view of its particular usefulness.

Figure 1A:
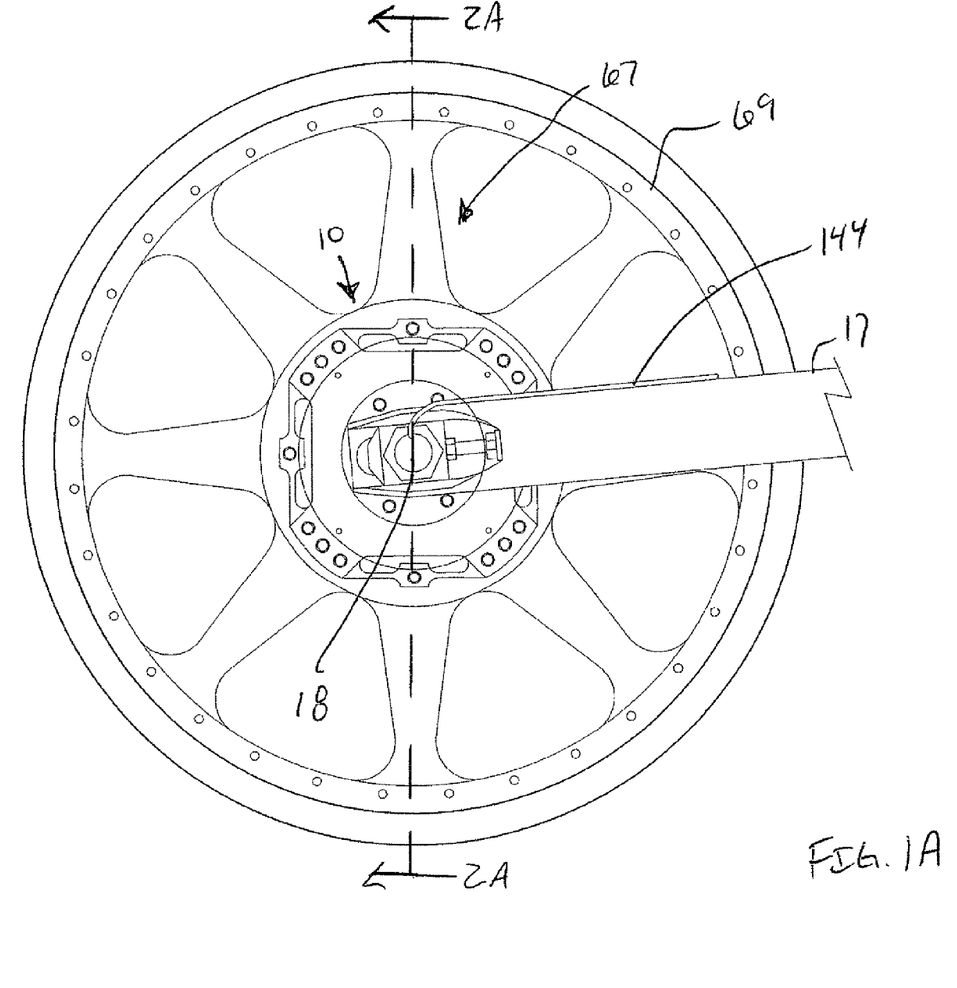
FIG. 1A is a side elevational view of a rear motorcycle wheel having a load cell system.
Figure 1B:
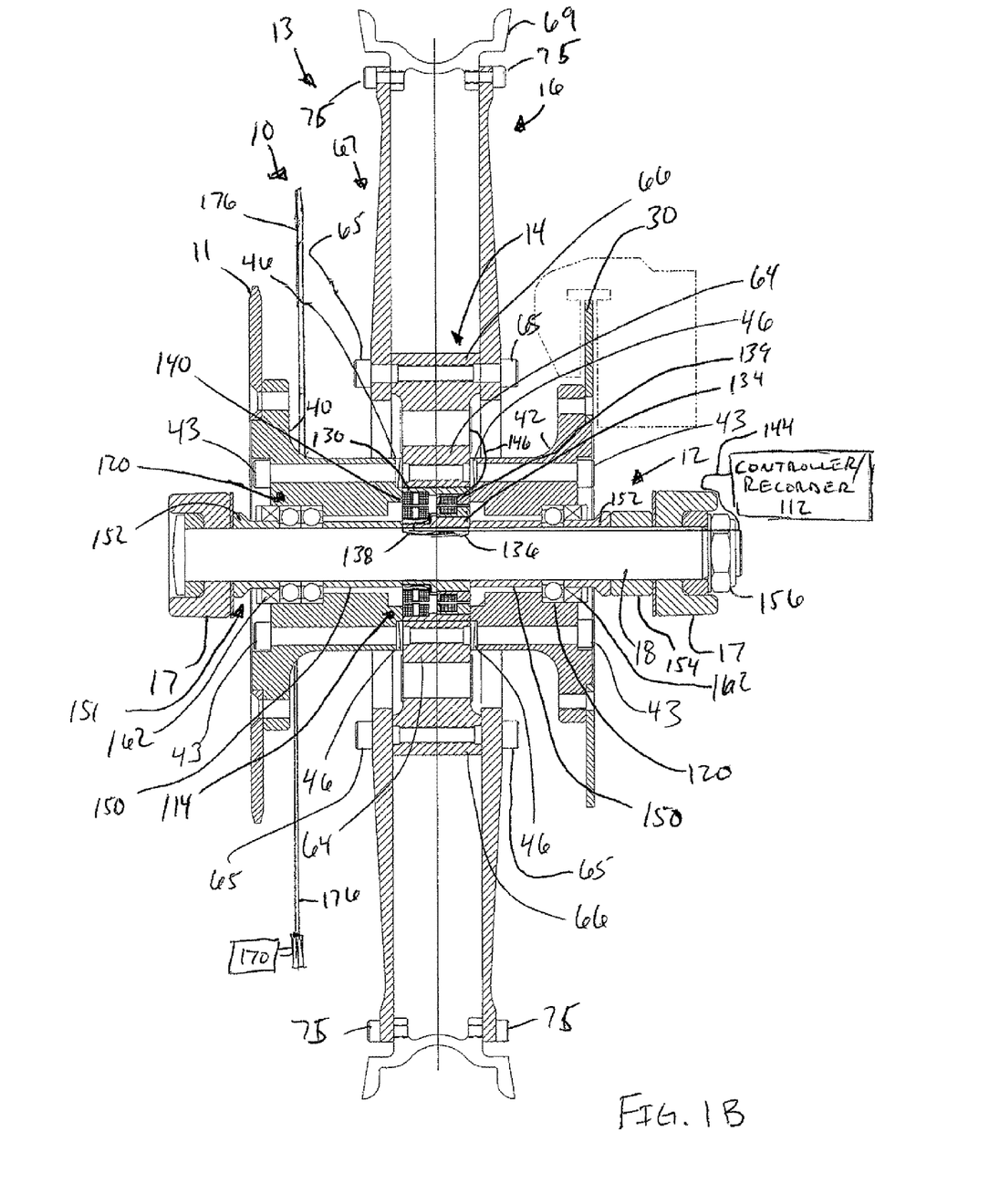
FIG. 1B is a sectional view of the rear motorcycle wheel of FIG. 1A taken along lines 1B-1B.
Figure 2A:
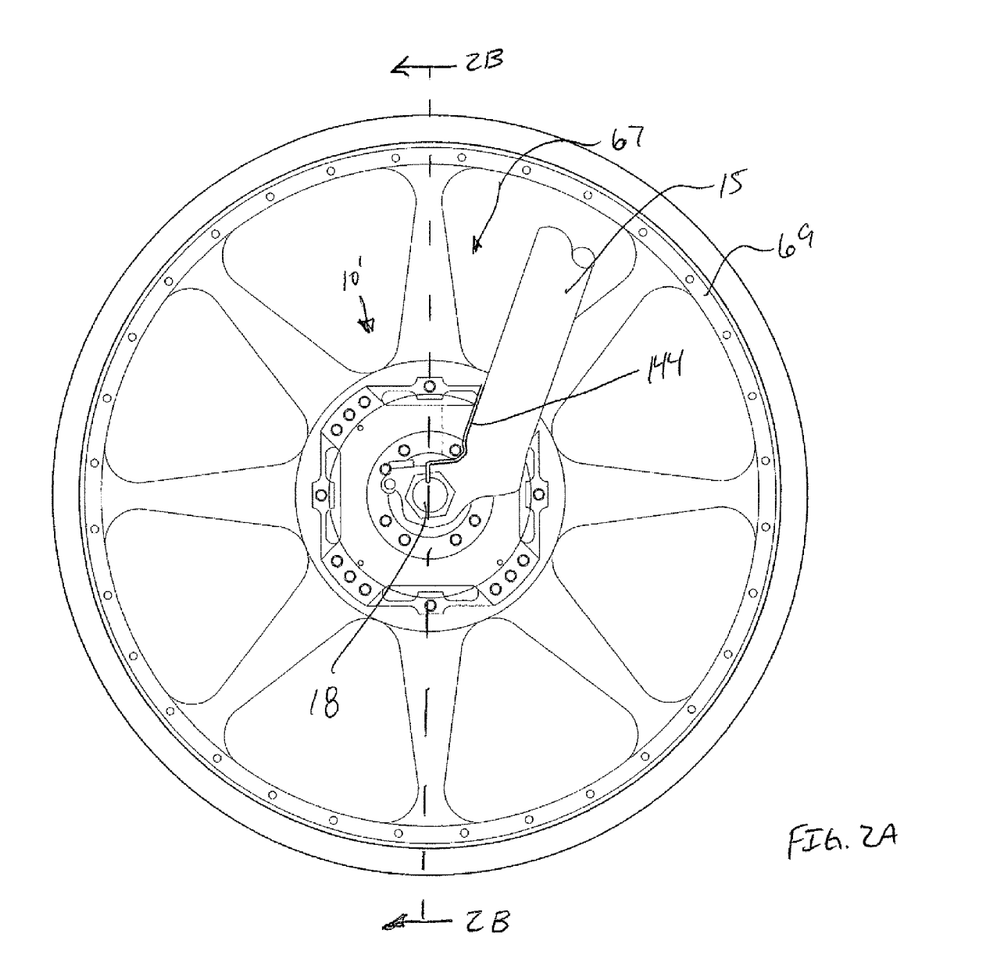
FIG. 2A is a side elevational view of a front motorcycle wheel having a load cell system.
Figure 2B:
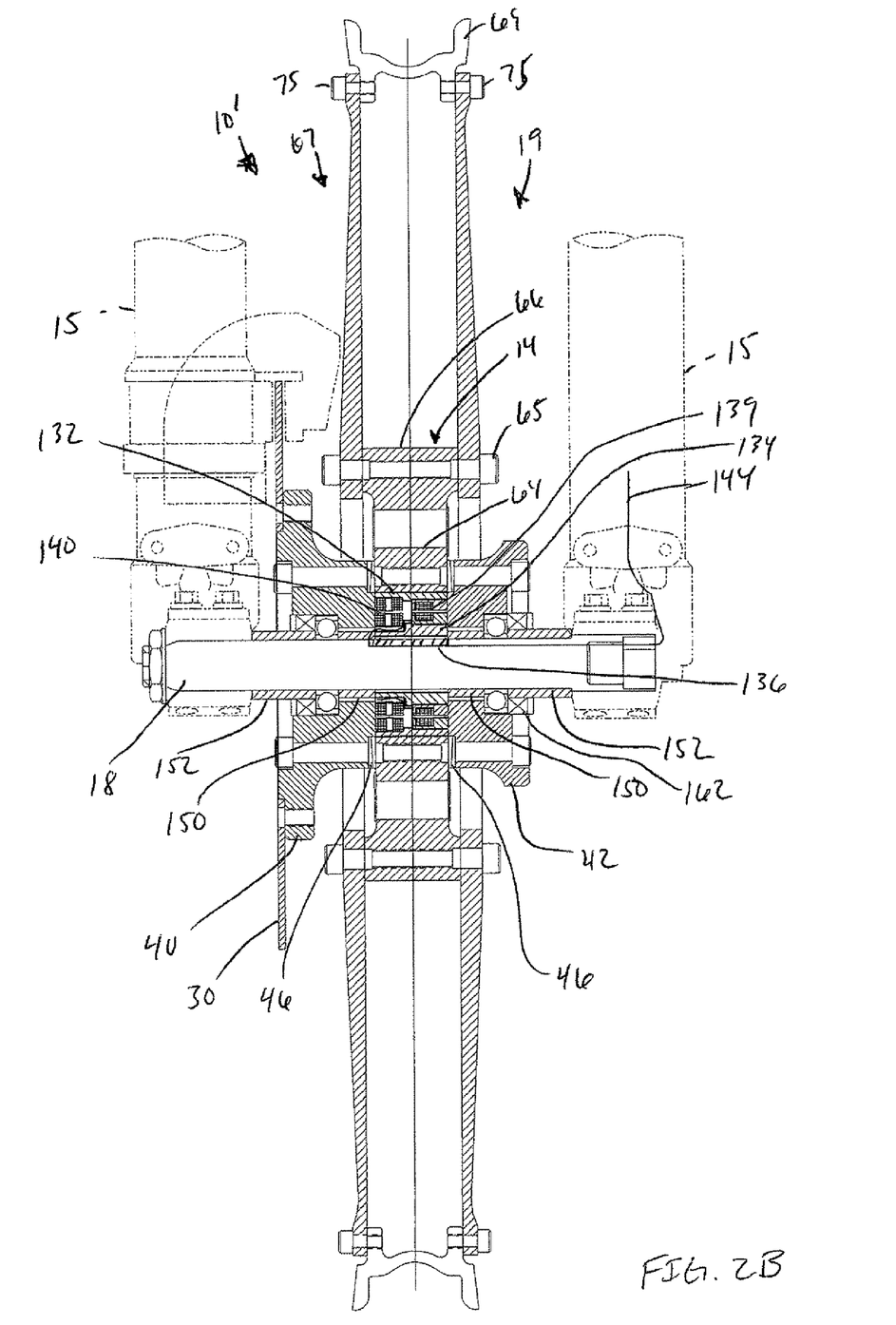
FIG. 2B is a sectional view of the front motorcycle wheel of FIG. 2A taken along lines 2B-2B.

FIGS. 1A and 1B illustrate a load cell system 10 as applied to a rear wheel assembly 13 of a motorcycle, wherein the motorcycle is not shown in its entirety, but can be considered as represented by sprocket 11 and swing arm 17. Likewise, FIGS. 2A and 2B illustrate a load cell system 10' as applied to a front wheel assembly 19 of a motorcycle, wherein the motorcycle is not shown in its entirety, but can be considered as represented by frame portion (front forks) 15. The load cell system 10' is substantially similar to the load cell system 10. Accordingly, where the same reference numbers have been used those parts have the same function.

With specific reference to FIGS. 1A and 1B, load cell system 10 generally includes a hub and axle assembly 12, a transducer 14 and a tire and rim assembly 16. In this embodiment, the hub assembly 12 and elements connected thereto rotate about a longitudinal axis of an axle 18 that extends between and is joined to portions of the frame as is used to support the rear wheel of the motorcycle.

Operatively connected to the hub assembly 12 is a drive assembly, herein the drive sprocket 11 although other forms of drive devices such as a shaft and gear assembly, belt, etc. can be used. A brake disc 30 is also illustrated as mounted to the other end of the hub assembly 12. Typically, the size and location of the sprocket 11 and brake disc 30 will correspond to that made by the manufacturer, where the load cell system 10 can accommodate these elements. In this manner, the load cell system 10 can thereby accurately record real-life forces and moments present on a motorcycle wheel assembly.

The hub assembly 12 is split, herein generally along the centerline of wheel assembly and comprises portions 40 and 42. Hub portions 40, 42 are joined together with the transducer 14 located therebetween with fasteners 43. In one embodiment, coupling teeth 46 can be provided to effectively transmit loads therebetween by increasing friction by the increased surface area provided by the mating teeth. Generally, the transducer has a central hub 64 and annular ring 66. The hub portions 40 and 42 are joined to the central hub 64, while a rim adapter assembly 67 is joined with fasteners 65 to the annular ring 66 (which can include mating teeth) and to a wheel rim 69 with fasteners 75.

In one embodiment, the transducer 14 is a separate component from rim adapter assembly 67 and one or both hub portions 40, 42, which conveniently allows the transducer 14 to be used many times with different types of wheel assemblies since then only the hub portions 40, 42 and/or rim adapter assembly 67 need be specifically designed to particular wheel assembly.

The transducer 14 for measuring force and moment components is secured to the hub assembly 12 and to rim adapter assembly 67 and used to support a tire on rim 69. The transducer 14 thus replaces a portion of the rim and carries force and moment loads between the hub 12 and the tire. It should be understood various forms of transducers can be used and incorporated in a manner as taught herein; however one particularly convenient transducer is as described in U.S. Pat. No. 5,969,268, the content of which is herein incorporated by reference in its entirety, wherein actual dimensions may be changed in order to accommodate the expected loads, size constraints and sensitivity.

Figure 3:
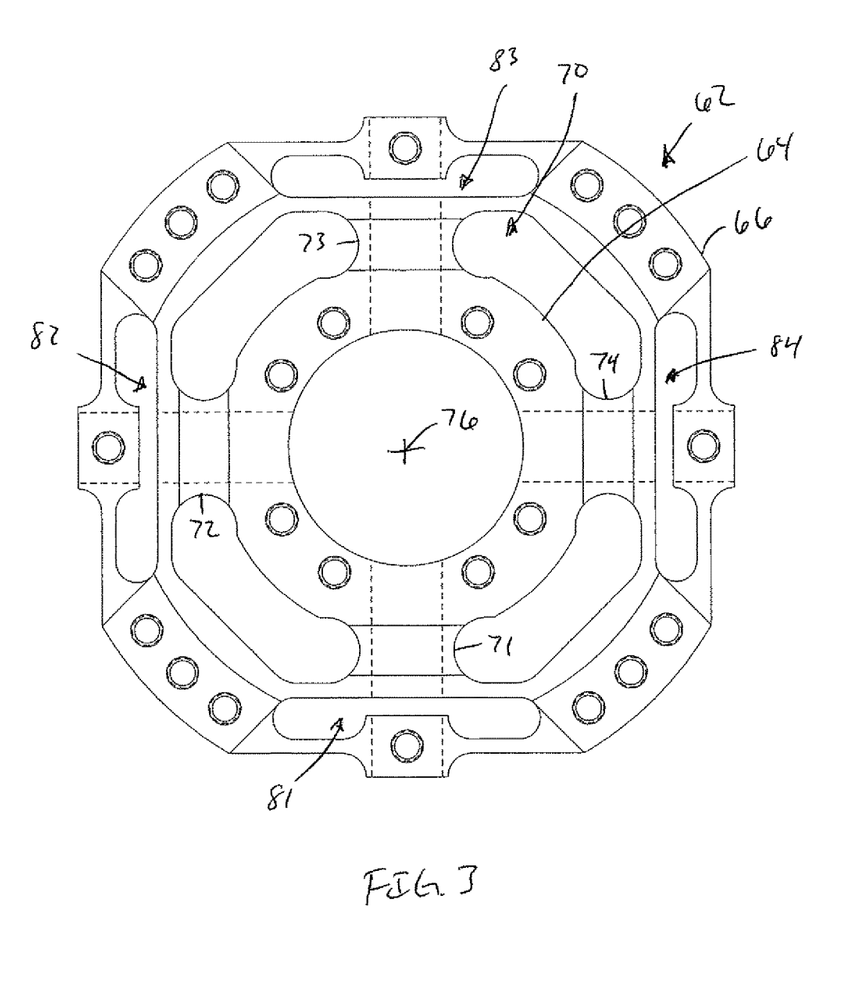
FIG. 3 is a side elevational view of a load cell.
Figure 4:
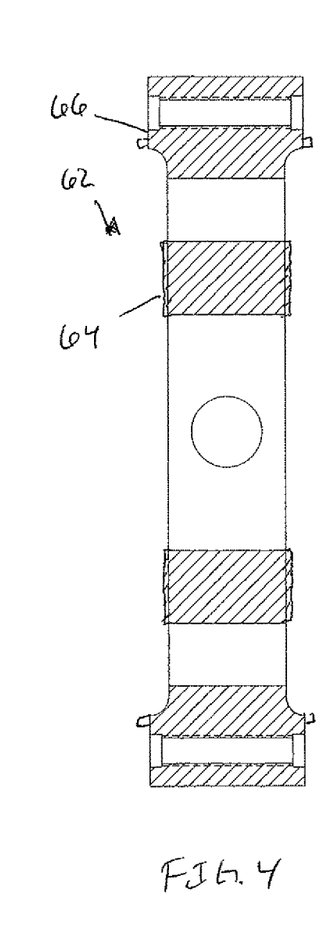
FIG. 4 is a sectional view of the load cell of FIG. 3 taken along lines 4-4.

In the exemplary embodiment illustrated in FIG. 3, transducer 14 includes an integral load cell body 62 fabricated from a single block of material. The body 62 includes the rigid central hub 64 and the rigid annular ring 66 that is concentric with the central hub 64. A plurality of radial tubes 70 joins the central hub 64 to the annular ring 66. In the embodiment illustrated, the plurality of radial tubes 70 comprises four tubes 71, 72, 73 and 74. Each of the tubes 71-74 extend radially from the central hub 64 toward the annular ring 66 along corresponding longitudinal axes. Although illustrated wherein the plurality of radial tubes 70 equals four, it should be understood that any number of tubes three or more can be used to join the central hub 64 to the annular ring 66. Preferably, the plurality of radial tubes 70 are spaced at equal angular intervals about a central axis indicated at 76.

In the embodiment illustrated, flexure members 81, 82, 83 and 84 join an end of each radial tube 71-74, respectively, to the annular ring 66. The flexure members 81-84 are compliant for displacements of each corresponding radial tube 71-74 along the corresponding longitudinal axes.

A plurality of sensors, for example strain sensors, can be mounted on the plurality of tubes 70 to sense strain therein. Although the plurality of sensors can be located on the plurality of radial tubes 70 to provide an indication of bending stresses therein, in one embodiment, the strain sensors are mounted conventionally to provide an output signal indicative of shear stresses in the walls of the plurality of radial tubes 70. In the embodiment illustrated, four sets of strain sensors are provided on each tube 71-74, preferably, approximately at the center of the longitudinal length of each tube. As described in U.S. Pat. No. 5,969,268, a first pair of strain sensors is provided on an upwardly facing portion of each radial tube 71-74. A second pair of strain sensors is mounted on a downwardly facing surface approximately 180 degrees from the first pair of strain sensors. The first and second pairs of strain sensors on each tube 71-74 are connected in a conventional Wheatstone bridge to form a first sensing circuit on each radial tube 71-74. A third pair of strain sensors is mounted approximately 90 degrees from the first pair of strain sensors while a fourth pair of strain sensors is mounted approximately 180 degrees from the third pair of strain sensors. The third and fourth pairs of strain sensors on each tube 71-74 are also connected in a conventional Wheatstone bridge to form a second sensing circuit on each radial tube 71-74. Commonly, the plurality of sensors comprises resistive strain gages. The plurality of sensors can function as shear sensors to provide an indication of shear stresses created in the radial tubes 70. If desired, the plurality of sensors can be mounted to the radial tubes 70 to function as bending sensors to provide an indication of bending stresses in the radial tubes 70. In this embodiment, the bending sensors can be located at a root of the tube or start of the fillet joining each tube 71-74 to the central hub 64. In addition, other forms of sensing devices such as but not limited to optically based sensors or capacitively based sensors can also be used. In addition or in the alternative, the flexures 81-84 can be used as sensing structures with suitable sensing devices detecting strain or displacement thereof.

In the embodiment illustrated having four radial tubes 71-74, eight individual shear-sensing Wheatstone bridges can be used. The number of sensing circuits can be increased or decreased, depending on the number of radial tubes used.

Output signals from the sensors or sensing circuits are indicative of force and moment components transmitted between the central hub 64 and the annular ring 66 in up to six degrees of freedom. It should be understood that the number of strain sensors and the number of sensing circuits can be reduced if measured forces and moments of less than six degrees of freedom is desired. Further details regarding resolving the signals from the sensors of the transducer 14 as force and moment measurements are described in U.S. Pat. No. 5,969,268; however, again it should be understood that other forms of transducers may be used.

In one embodiment, power is supplied to and output signals are obtained from the plurality of sensors by a controller and/or recorder 112 through a slip ring assembly 114 as the tire rim 69, transducer 14 and hub 12 with elements connected thereto rotate on bearings 120.

Figure 5:
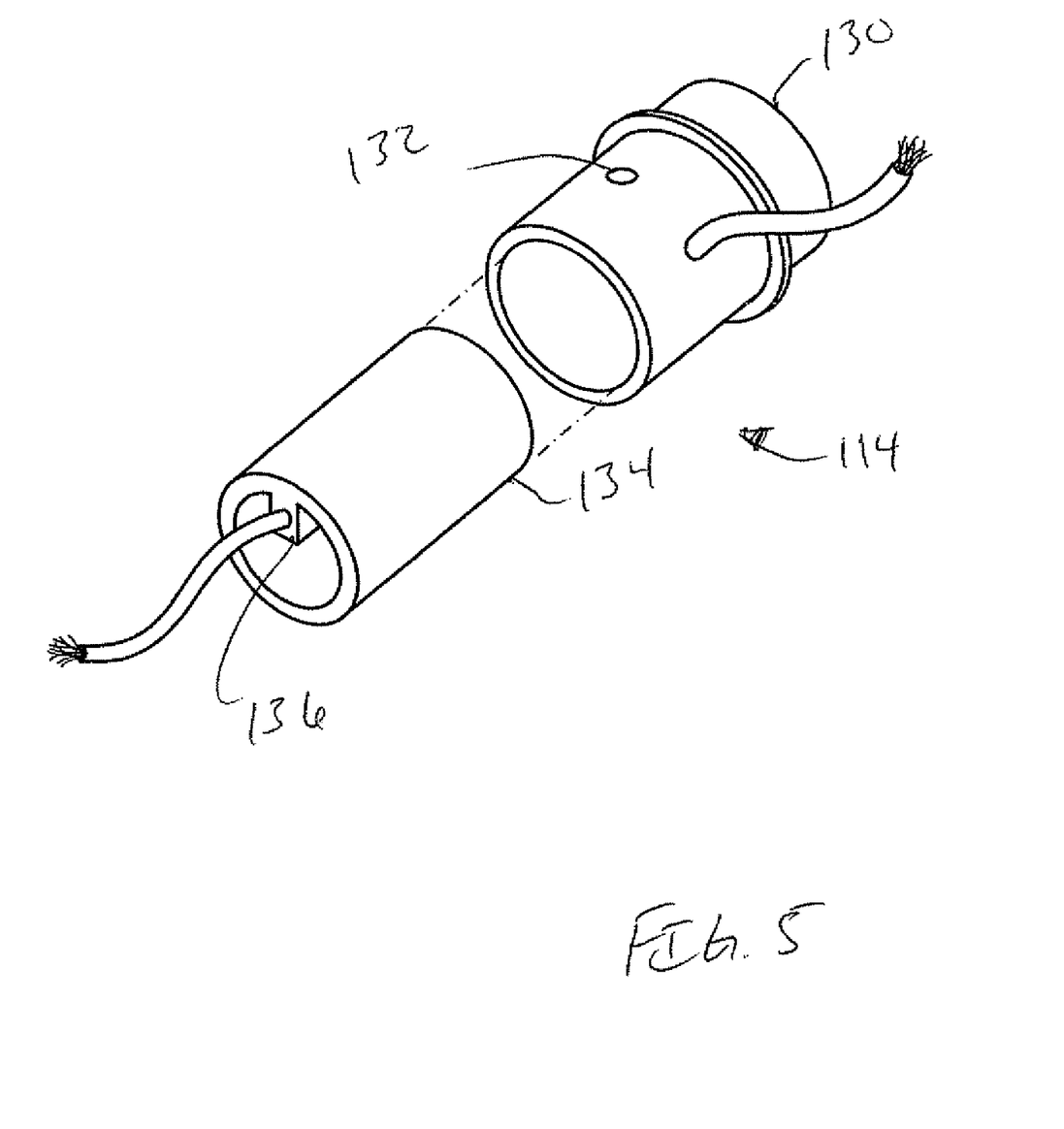
FIG. 5 is a perspective view of a slip ring and brush assembly with parts separated.

Referring to FIG. 5, a first embodiment of a slip ring assembly 114 includes an outer member 130 secured to the central hub 64 so as to rotate therewith such as with a pin through aperture 132. An inner member 134 is secured to the axle 18 and remains stationary therewith. For instance, a key 136 can be provided to mate with a corresponding longitudinal groove 138 provided in the axle 18, which can be solid. A brush and slip ring assembly 139 are operably coupled to members 130 and 132 in the annular space therebetween. If desired, an encoder assembly 140 can also be provided in the annular space. Cabling 144 from the brush assembly 139 with respect to the inner member 134 can extend along the length of the groove 138, while cabling 146 from the brush assembly 139 with respect to the outer member 130 can be routed to circuitry of the transducer 14.

The slip ring assembly 114 and bearings 120 are held in place longitudinally along axle 18 through a concentric loading assembly 151 around the axle 18. The concentric loading assembly 151 includes spacers 150, 152 and 154 (each having a bore through which the axle 18 extends) in compression along with the inner races of the bearings 120 and inner member 134 when the axle 18 is placed in tension by axle nut 156. It should be noted that the location of the slip ring assembly 114 on the axle 18 allows seals 162 used to protect the bearings 120 and also the slip ring assembly 114, while the overall design allows access to the brush assembly 139 when repair is necessary.

If desired an external encoder 170 to monitor the angular position of the wheel assembly can be used. For instance, a sprocket or similar rotating member 176 can be used to drive a drive wheel of the encoder mounted somewhere else on the motorcycle.

Figure 6A:
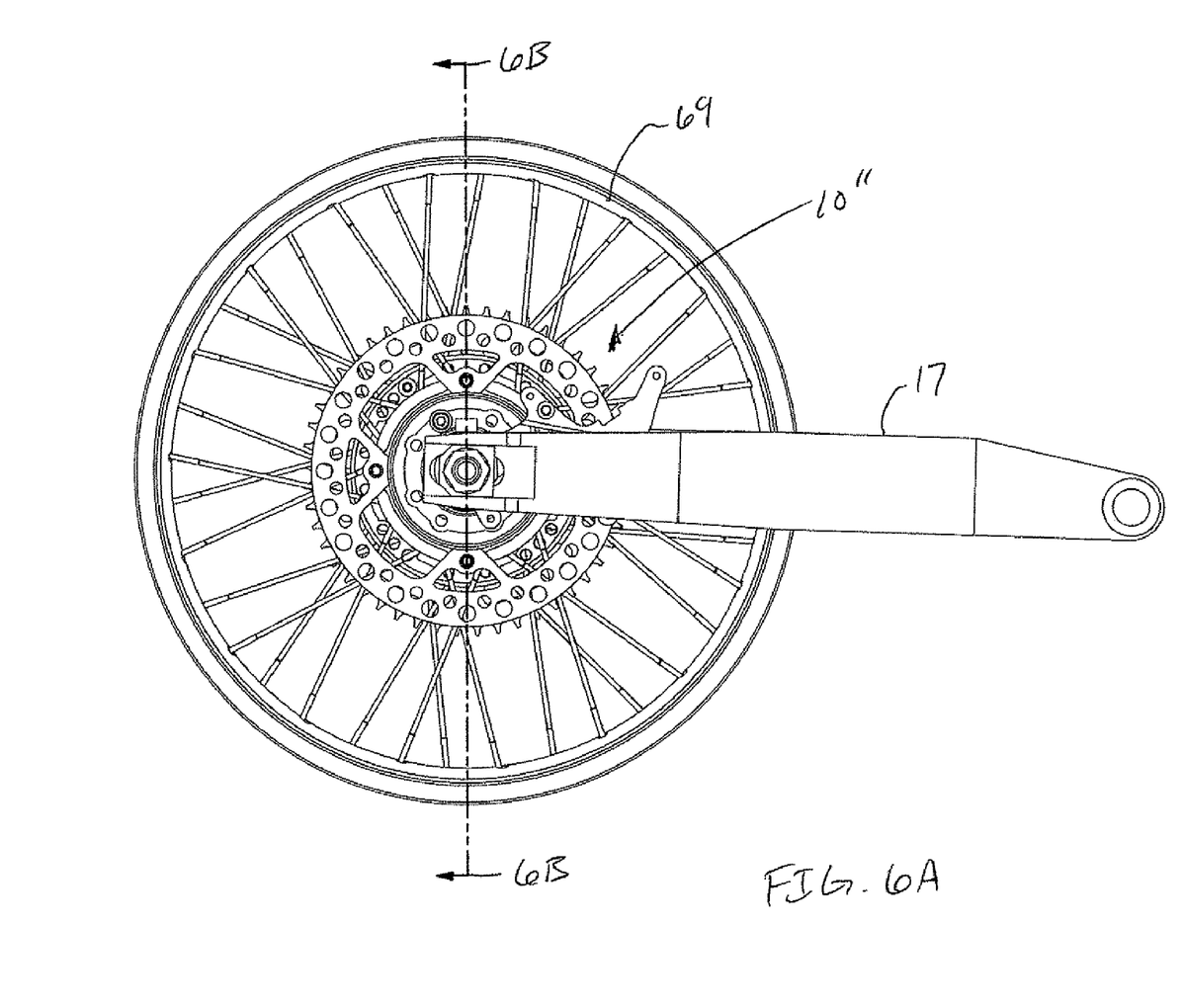
FIG. 6A is a side elevational view of another rear motorcycle wheel having a load cell system.
Figure 6B:
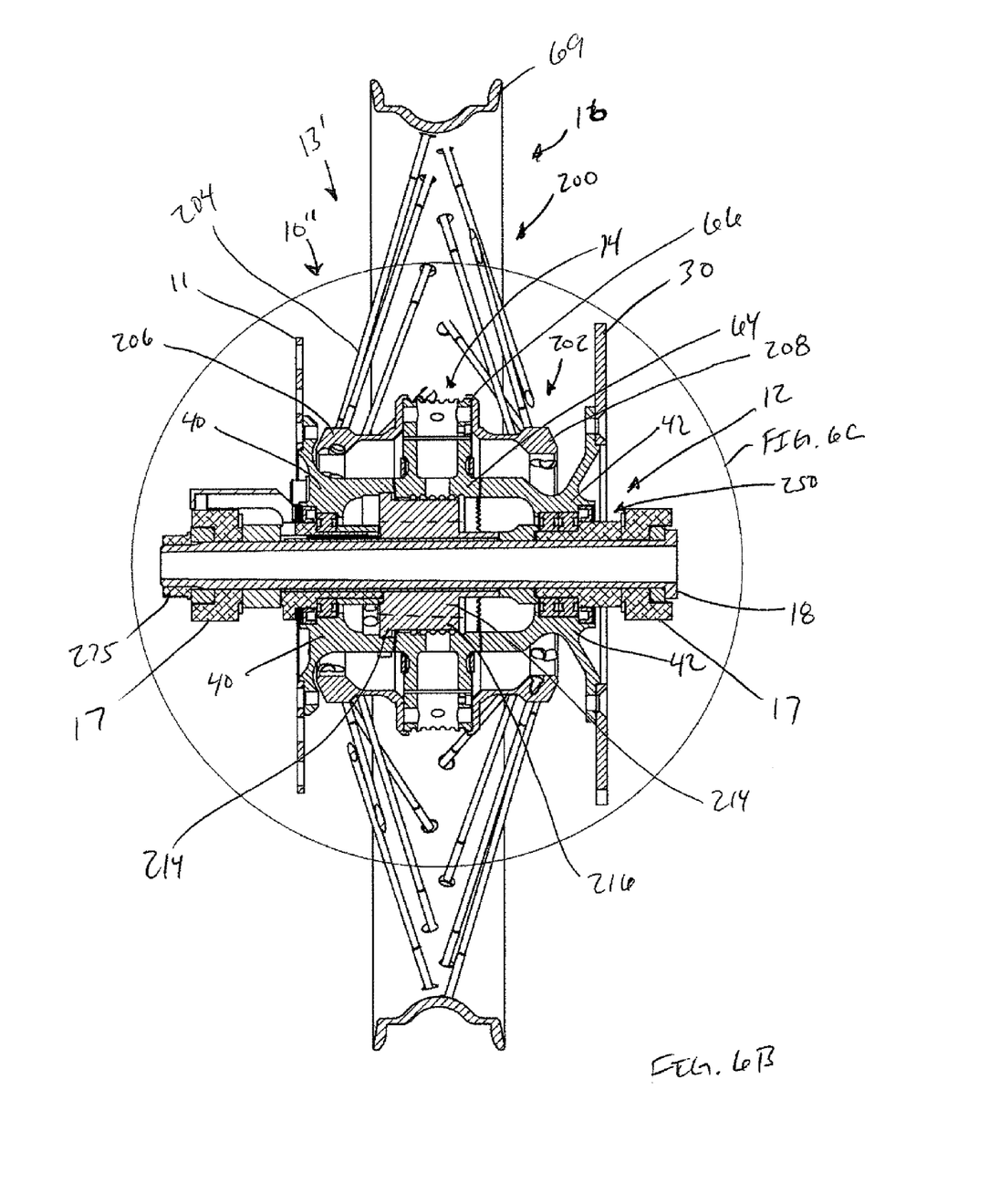
FIG. 6B is a sectional view of the rear motorcycle wheel of FIG. 6A taken along lines 6B-6B.
Figure 6C:
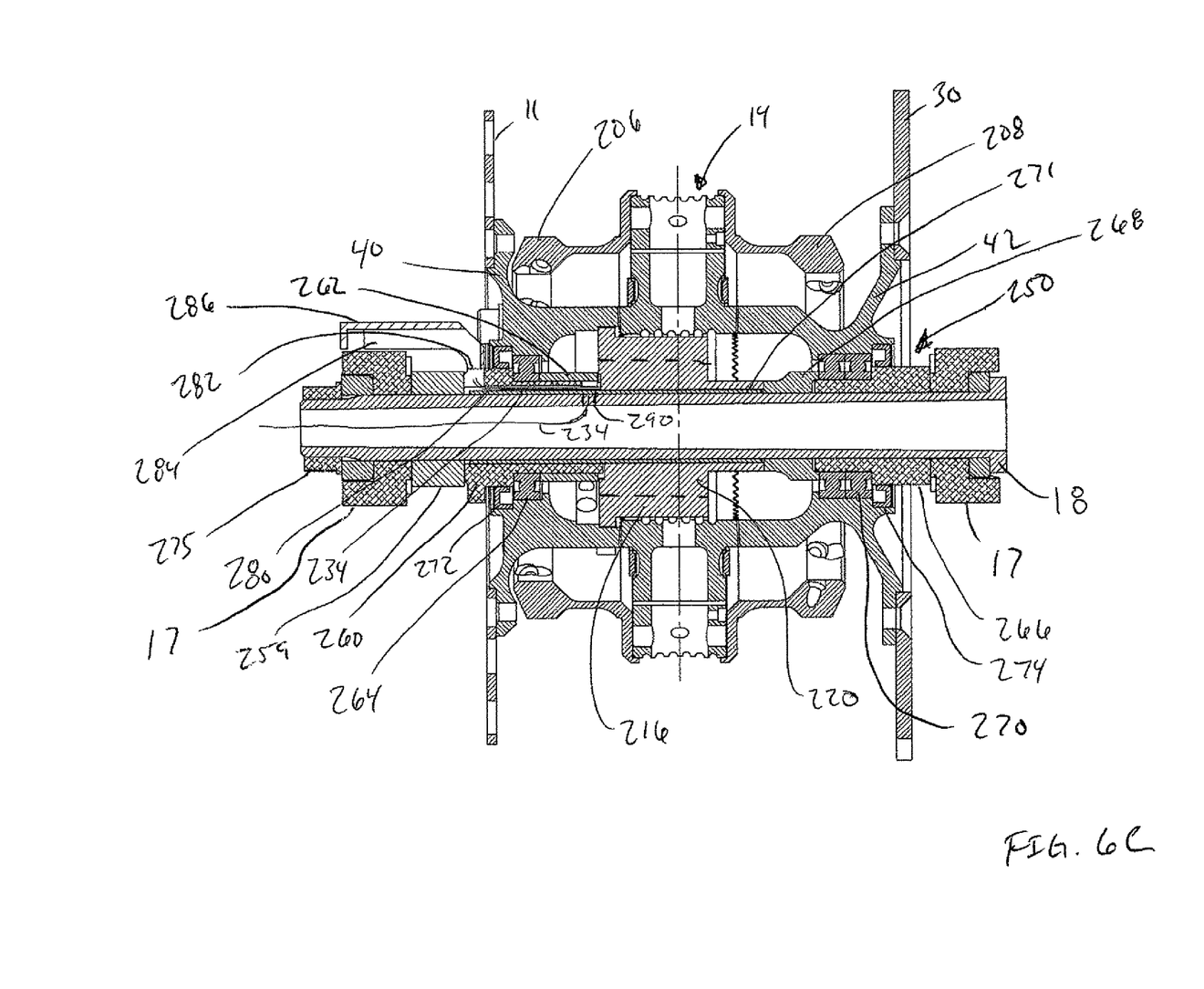
FIG. 6C is an enlarged portion of FIG. 6B with the rim and spokes removed.
Figure 7A:
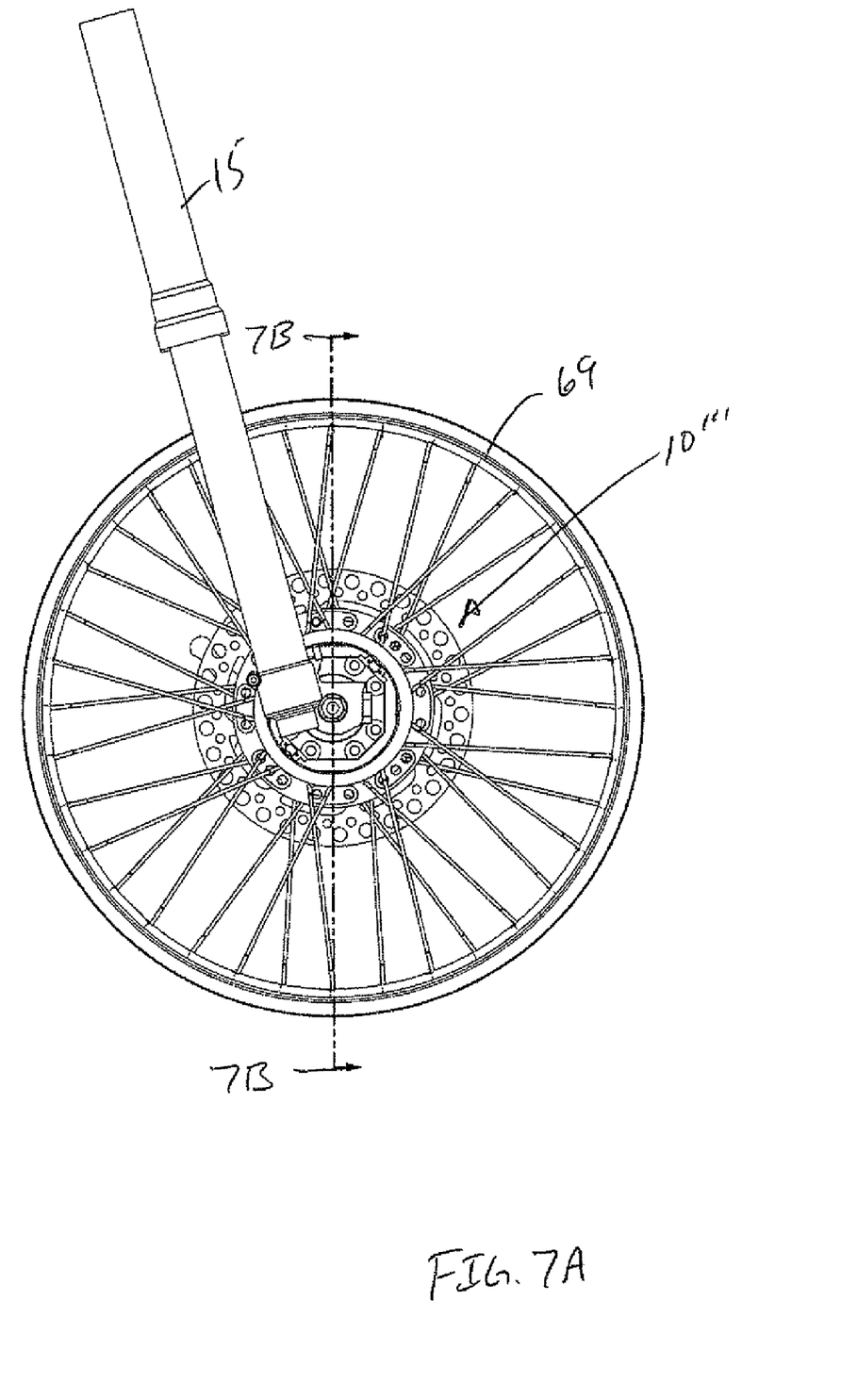
FIG. 7A is a side elevational view of another front motorcycle wheel having a load cell system.
Figure 7B:
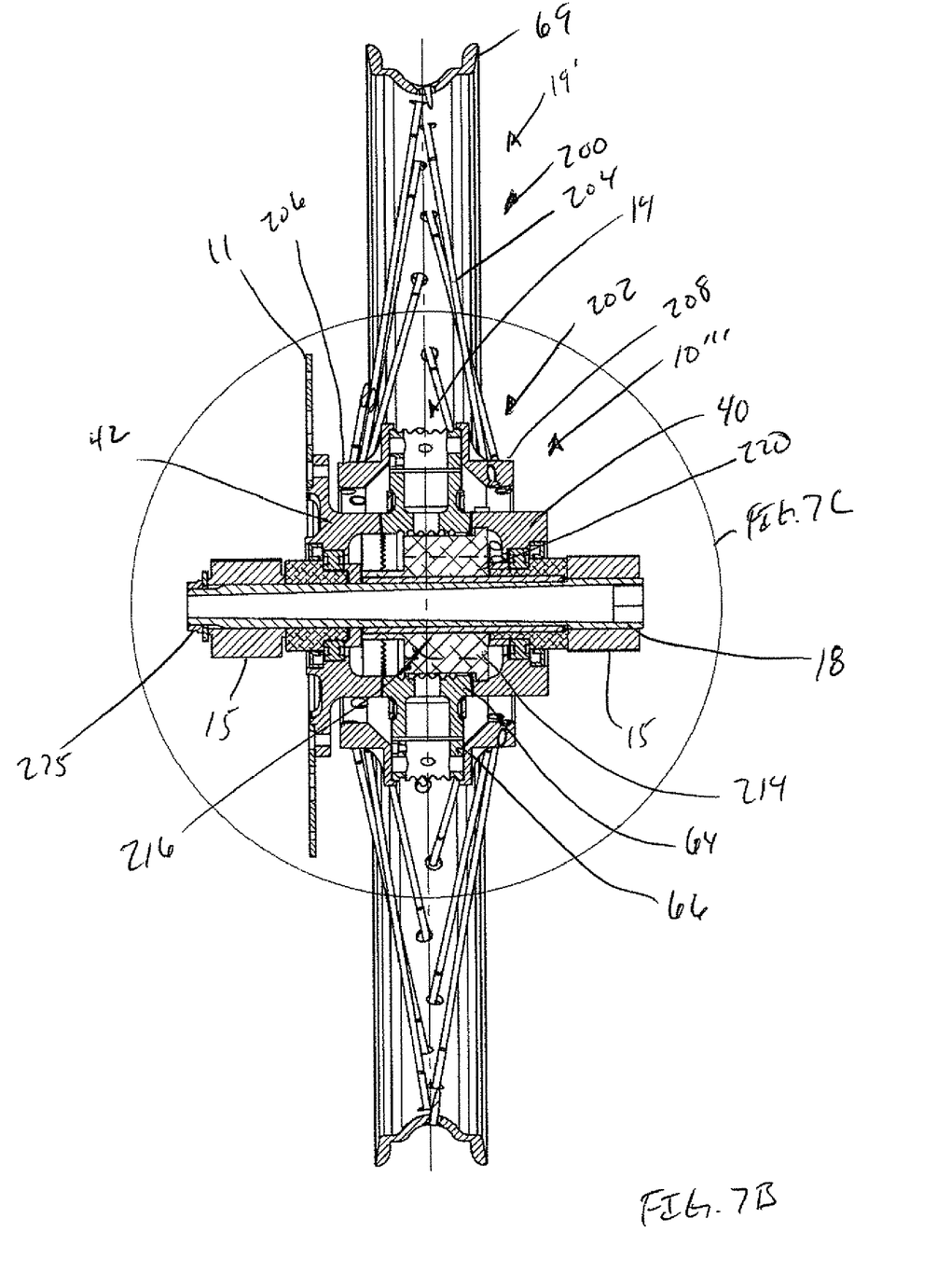
FIG. 7B is a sectional view of the front motorcycle wheel of FIG. 7A taken along lines 7B-7B.

FIGS. 6A, 6B and 6C illustrate a load cell system 10" as applied to another rear wheel assembly 13' of a motorcycle, wherein the motorcycle is not shown in its entirety, but can be considered as represented by sprocket 11 and swing arm 17. Likewise, FIGS. 7A, 73 and 7B illustrate a load cell system 10''' as applied to another front wheel assembly 19' of a motorcycle, wherein the motorcycle is not shown in its entirety, but can be considered as represented by frame portion (front forks) 15. The load cell systems 10" and 10''' are substantially similar to each other, but have also have similar components to those discussed above with respect to the load cell systems 10 and 10'. Accordingly, where the same reference numbers have been used those parts have the same function as described above.

With specific reference to FIGS. 6A, 6B and 6C, load cell system 10" generally includes the split hub (portions 40,42) and axle assembly 12, the transducer 14 and the tire and rim assembly 16, which rotate about and on the axle shaft 18 that extends between and is joined portions of the frame as is used to support the rear wheel of the motorcycle. In this embodiment, the hub portions 40, 42 are joined to the sprocket 11 and brake disc 30, respectively, as well as to the central hub 64 of transducer 14. The annular ring 66 of transducer 14 is joined to the rim 69 using a spoke assembly 200 comprising a spoke hub support 202 and a plurality of spokes 204. In the illustrative embodiment, the spoke hub support 202 includes portions 206 and 208 suitably fastened such as with bolts to annular ring 66 on opposite sides thereof. This construction conveniently allows the transducer 14 to be used many times with different types of wheel assemblies where the hub portions 40, 42 and/or spoke assembly 200 need be specifically designed to a particular wheel assembly.

As in the previous embodiments, power is supplied to and output signals are obtained from the transducer 14 through a slip ring assembly 214 mounted within the hub assembly 12 as the tire rim 69, transducer 14 and hub assembly 12 rotate.

Figure 8:
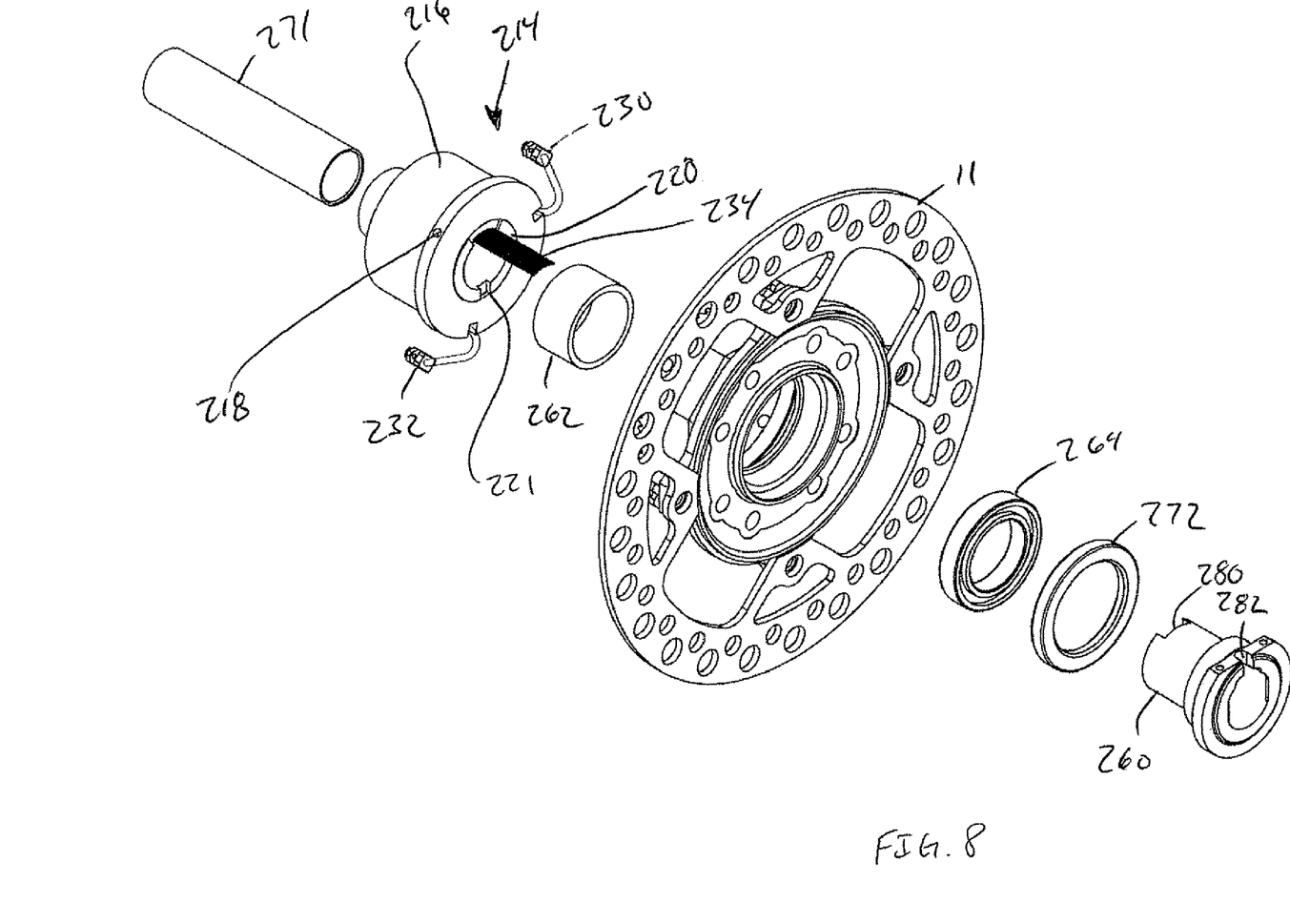
FIG. 8 is an exploded perspective view of a hub assembly for the rear motorcycle wheel of FIG. 6A.

Referring also to FIG. 8, the slip ring assembly 214 includes an outer member 216 secured to the central hub 64 so as to rotate therewith such as with a pin through aperture 218. An inner member 220 is secured to the axle 18 and remains stationary therewith. For instance, a keyway 221 in the inner member 220 can be provided to mate key elements on a spacer described below.

A brush and slip ring assembly (not illustrated but similar to that of slip ring 114) are operably coupled to members 216 and 220 (schematically separated in FIGS. 63 and 6C). Connectors 230 and 232 connect to transducer 14, while wires 234 extend outwardly toward an end of the axle 18. If desired, an encoder assembly can be provided in the slip ring assembly 214, or an external encoder can be used. A suitable slip ring assembly is available from Michigan Scientific Corporation of Charlevoix, Mich., USA.

The slip ring assembly 214 is held in place longitudinally along axle 18 through a concentric loading assembly 250 around the axle 18. In the embodiment illustrated, concentric loading assembly 250 includes an axle spacers 259, 260 and load spacer 262 with ends thereof cooperating with each other so as to mount and support bearing assembly 264. It should be noted axle spacer 260 includes a longitudinal groove 280 parallel to axle 18 through which wires 234 extend and then out through aperture 282 and guided through a channel 284 in a wire guide 286 proximate swing arm 17.

Likewise, on the opposite side of axle 18 an axle spacer 266 and load spacer 268 have ends that cooperate so as to mount and support bearing assembly 270. A sleeve 271 can be disposed along the axle radially inward from inner member 220. The thickness of the sleeve 271 allows the various components supported by the axle to adapt to the diameters of different axles. The axle spacers 260, 266, load spacers 262, 268, inner races of bearings 264, 270 and inner member 220 (each having a bore through which the axle 18 extends) are loaded in compression with tightening of axle nut 275 and tension on the axle 18. Each end further includes seals 272 and 274 to prevent water and other contaminates from reaching the slip ring assembly 214.

It should be noted the slip ring assembly 114,214 are located on the axle 18 between the bearings and in the hub 12 preferably inline with the central hub 64, or stated another way so as to intersect with a central plane of the load cell body 62.

Furthermore, the load cell body 62 is not sensitive to loads (such as chain or braking loads on a motorcycle) that are not reacted to the annular ring 66 (i.e. tire contact patch) of the load cell body 62, which are rather shunted into the bearings.

Figure 7C:
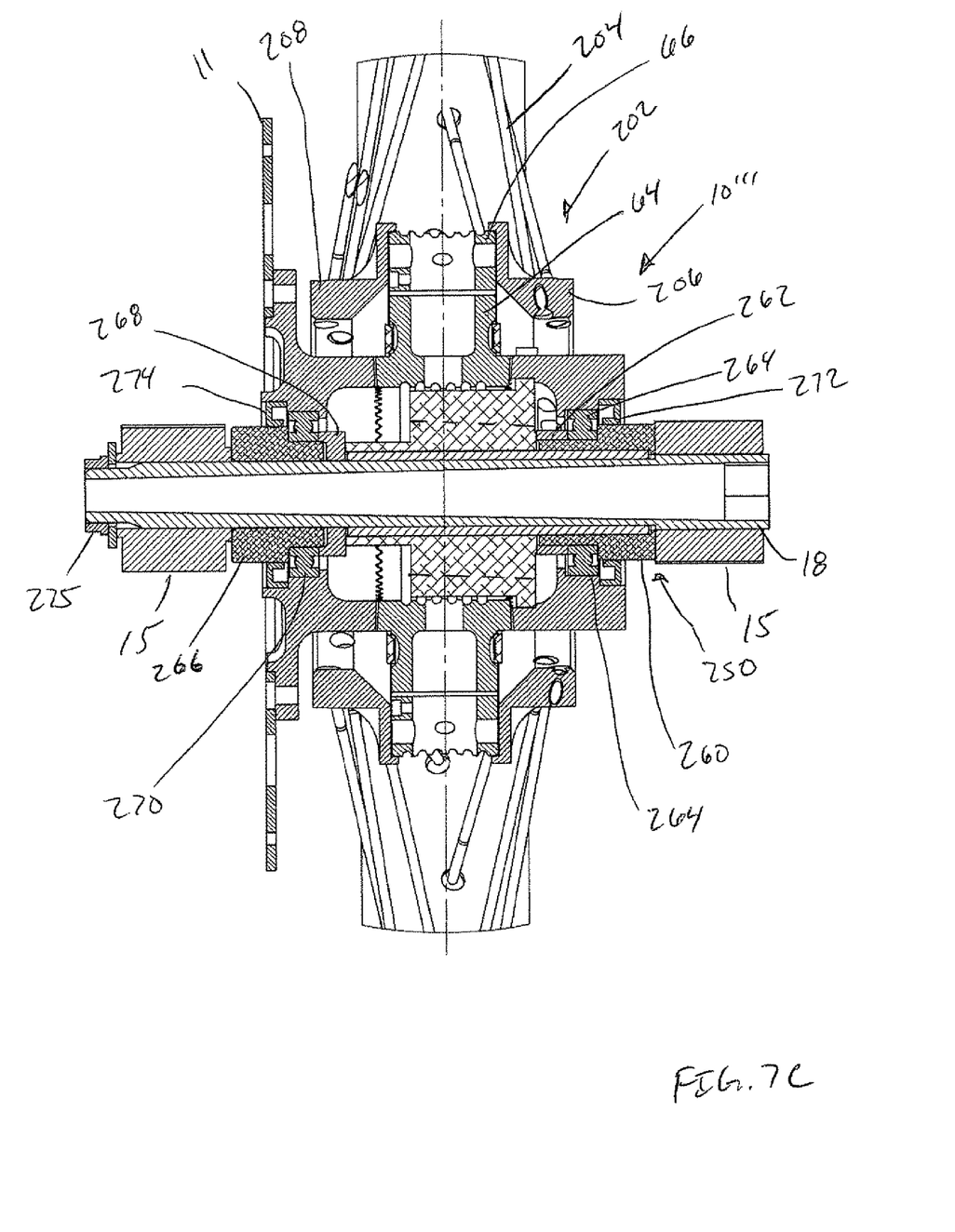
FIG. 7C is an enlarged portion of FIG. 7B with the rim removed.

A similar construction is used in the front wheel assembly of FIGS. 7A-7C, where the same reference numbers have been used to identify similar functioning elements as those described above.

Although illustrated above where the axle 18 is supported at both ends of the frame, aspects herein described can be used on a frame where the frame supports the rotating body such as a wheel from one side. For instance, aspects of the invention can be used on a single sided swing arm as found on some motorcycles. Also, tire testing machines and truck axles commonly have a quill shaft to drive the rotating body. In all of these other embodiments, the slip ring assembly can be mounted so that a first member rotates with the hub (which need not always be split) and a second member is held stationary where the wires exit toward the frame along a groove in the axle and/or through a channel formed in an axle spacer as described above. Likewise, for all embodiments that have a hollow or partial hollow axle (e.g. FIG. 6C), an aperture 291 can be provided at any point along the length where the wires 234 from the slip ring assembly can then extend into and thus along the axle within its bore. Rings or brushes of the slip ring assembly can also be directly attached to or formed on the axle if desired.

Although the present invention has been described with reference to preferred embodiments, workers skilled in the art will recognize that changes may be made in form and detail without departing from the spirit and scope of the invention.

What is claimed is:

1. A load cell assembly for sensing force and/or moment components on a rotating body supported by a frame, the assembly comprising:
   an axle having opposite ends joined to the frame;
   a hub supported by the axle and rotatable about a longitudinal axis thereof; and
   a load cell body joined to the hub and the rotating body to sense force and/or moment components between the hub and the rotating body.

2. The load cell assembly of claim 1 and further comprising a slip ring assembly disposed in the hub having a first member movable relative to a second member, the first member being rotatable with the hub.

3. The load cell assembly of claim 2 and further comprising a bearing joined to the hub and supported by the axle.

4. The load cell assembly of claim 3 and further comprising a second bearing joined to the hub and supported by the axle, the second bearing being spaced apart from the first-mentioned bearing on the axle.

5. The load cell assembly of claim 4 wherein the slip ring assembly is disposed between the first-mentioned bearing and the second bearing.

6. The load cell assembly of claim 5 wherein the hub comprises a first portion joined to the first-mentioned bearing and to the load cell body, and a second portion joined to the second bearing and to the load cell body.

7. The load cell assembly of claim 6 wherein the second member includes a bore through which the axle extends.

8. The load cell assembly of claim 7 and further comprising a pair of spacers through which the axle extends wherein a spacer is disposed between each of the bearings and the second member.

9. The load cell assembly of claim 8 wherein the axle includes a groove through which wires from the second member extend to an end of the axle.

10. The load cell assembly of claim 7 wherein the axle includes a groove through which wires from the second member extend to an end of the axle.

11. The load cell assembly of claim 7 wherein wires from the second member extend to an end of the axle through a channel formed between one of the spacers and the axle.

12. The load cell assembly of claim 3 and further comprising a seal at each end of the axle where the first-mentioned bearing, the second bearing and the slip ring assembly are disposed between the seals.

13. In combination with a frame portion of a motorcycle or similar wheel assembly, a load cell assembly for sensing force and/or moment components on the motorcycle or similar wheel assembly, the load cell assembly comprising:
    an axle mounted at each end to the frame portion;
    a hub rotatably supported by the axle;
    a rim rotatably supported by the hub frame;
    a tire supported on the rim; and
    a load cell body operatively joined to the hub and the rim.

14. The combination of claim 13 and further comprising a first bearing joined to the hub and a second bearing joined to the hub, the second bearing being spaced apart from the first bearing on the axle.

15. The combination of claim 14 wherein the hub comprises a first portion joined to the first bearing and to the load cell body, and a second portion joined to the second bearing and to the load cell body.

16. The combination of claim 15 wherein the load cell includes a central hub and an annular rim, wherein the central hub is joined to each hub portion.

17. The combination of claim 16 and further comprising a slip ring assembly having a first member movable relative to a second member, the first member being rotatable with the load cell body.

18. The combination of claim 17 wherein the second member includes a bore through which the axle extends.

19. The combination of claim 17 wherein wires from the second member extend along a length of the axle to one of the ends thereof.

20. The combination of claim 13 and further comprising a slip ring assembly disposed in the hub wherein the axle extends through a portion of the slip ring assembly.

21. A load cell assembly for sensing force and/or moment components on a rotating body supported by a frame, the assembly comprising:
    an axle joined to the frame on at least one end of the axle;
    a hub supported by the axle and rotatable about a longitudinal axis thereof;
    a load cell body joined to the hub and the rotating body to sense force and/or moment components between the hub and the rotating body wherein the load cell rotates about the longitudinal axis of the axle along with the hub and the rotating body; and
    a slip ring assembly disposed in the hub having a first member movable relative to a second member, the first member being rotatable with the hub.

22. The load cell assembly of claim 21 wherein the load cell includes a central hub and an annular rim, wherein the central hub is joined to each hub portion.

23. The load cell assembly of claim 22 and further comprising a slip ring assembly having a first member movable relative to a second member, the first member being rotatable with the load cell body.

24. The load cell assembly of claim 23 wherein the second member includes a bore through which the axle extends.

25. The load cell assembly of claim 23 wherein wires from the second member extend along a length of the axle to one of the ends thereof.

26. The load cell assembly of claim 23 and further comprising at least one spacer having an aperture through which the axle extends, and wherein the second member includes an aperture through which the axle extends, and wherein when the axle is in tension the second member is held in position on the axle by compressive forces placed in the second member and the spacer.

* * * * *